(12) United States Patent
Hwang

(10) Patent No.: US 6,671,143 B2
(45) Date of Patent: Dec. 30, 2003

(54) TECHNIQUE FOR LIMITING CURRENT THROUGH A REACTIVE ELEMENT IN A VOLTAGE CONVERTER

(75) Inventor: Jeffrey H. Hwang, Saratoga, CA (US)

(73) Assignee: Champion Microelectronic Corp., Hsinchu (TW)

( * ) Notice: Subject to any disclaimer, the term of this patent is extended or adjusted under 35 U.S.C. 154(b) by 0 days.

(21) Appl. No.: 10/269,177

(22) Filed: Oct. 11, 2002

(65) Prior Publication Data

US 2003/0034760 A1 Feb. 20, 2003

Related U.S. Application Data

(63) Continuation-in-part of application No. 09/823,836, filed on Mar. 30, 2001.

(51) Int. Cl.[7] .................................................. H02H 7/00
(52) U.S. Cl. .......................... 361/18; 361/93.9; 323/278
(58) Field of Search ................................ 361/180, 93.9; 323/901, 908, 277, 278, 276, 280

(56) References Cited

U.S. PATENT DOCUMENTS

| | | | |
|---|---|---|---|
| 3,646,439 A | 2/1972 | Broski | |
| 4,504,898 A | * 3/1985 | Pilukaitis et al. | 363/49 |
| 4,580,090 A | * 4/1986 | Bailey et al. | 323/303 |
| 4,754,388 A | 6/1988 | Pospisil | |
| 5,396,165 A | 3/1995 | Hwang et al. | |
| 5,565,761 A | 10/1996 | Hwang | |
| 5,570,276 A | 10/1996 | Cuk et al. | |
| 5,592,128 A | 1/1997 | Hwang | |
| 5,742,151 A | 4/1998 | Hwang | |
| 5,747,977 A | 5/1998 | Hwang | |
| 5,798,635 A | 8/1998 | Hwang et al. | |
| 5,804,950 A | 9/1998 | Hwang et al. | |
| 5,818,207 A | 10/1998 | Hwang | |
| 5,831,418 A | 11/1998 | Kitagawa | |
| 5,859,527 A | 1/1999 | Cook | |
| 5,867,379 A | 2/1999 | Maksimovic et al. | |
| 5,894,243 A | 4/1999 | Hwang | |
| 5,903,138 A | 5/1999 | Hwang et al. | |
| 5,912,549 A | 6/1999 | Farrington et al. | |
| 5,912,552 A | 6/1999 | Tateishi | |
| 6,060,867 A | 5/2000 | Farrington et al. | |
| 6,091,233 A | 7/2000 | Hwang et al. | |
| 6,140,808 A | 10/2000 | Massie | |
| 6,166,528 A | 12/2000 | Rosetti et al. | |
| 6,215,290 B1 | 4/2001 | Yang et al. | |
| 6,307,356 B1 | 10/2001 | Dwelley | |
| 6,344,980 B1 | 2/2002 | Hwang et al. | |
| 6,346,778 B1 | 2/2002 | Mason et al. | |
| 6,452,366 B1 | 9/2002 | Hwang | |
| 6,469,914 B1 | 10/2002 | Hwang et al. | |
| 6,483,281 B2 | 11/2002 | Hwang | |

* cited by examiner

*Primary Examiner*—Shawn Riley
(74) *Attorney, Agent, or Firm*—Derek J. Westberg

(57) ABSTRACT

A current limiting technique for a voltage converter. A current through a reactive element in a voltage converter is limited. Current from a supply is switched through a reactive element in accordance with a switch control signal for forming a regulated output voltage in a feedback loop. A first signal that is representative of the input current is sensed. A voltage that is representative of the output voltage of the voltage converter is sensed. A second signal that is representative of a difference between the output voltage and a desired voltage is formed. A selected one of the first signal and the second signal is compared to a ramp signal for forming the switch control signal wherein the selected one of the first signal and the second signal is selected according to the relative magnitudes of the first and second signal.

15 Claims, 6 Drawing Sheets

TECHNIQUE FOR LIMITING CURRENT THROUGH A REACTIVE ELEMENT IN A VOLTAGE CONVERTER

This is a continuation-in-part of U.S. application Ser. No. 09/823,836, filed Mar. 30, 2001.

FIELD OF THE INVENTION

The present invention relates to the field of voltage converters. More particularly, the present invention relates to prevention of over-current conditions in voltage converters.

BACKGROUND OF THE INVENTION

In a conventional voltage converter, an output voltage is typically monitored, compared to a predetermined desired level and a response is developed to more precisely attain the desired output voltage. More particularly, to adjust the output voltage, the input current is modulated up or down. Conventional modulation techniques include pulse-width modulation (PWM) and frequency modulation.

FIG. 1 illustrates a voltage converter of the prior art. An unregulated direct-current DC voltage source Vin1 is coupled to a first terminal of a switch SW1. A second terminal of the switch SW1 is coupled to a first terminal of an inductor L1 and to a first terminal of a switch SW2. A second terminal of the inductor L1 is coupled to a first terminal of an output capacitor C1. A second terminal of the switch SW2 and a second terminal of the capacitor C1 are coupled to ground.

When the switch SW1 is closed, the switch SW2 is open. Under these conditions, current flows from the input source Vin1 through the inductor L1 and charges the capacitor C1. Thus, an output voltage Vout1 formed across the capacitor C1 tends to increase. When the switch SW1 is open, the switch SW2 is closed. Under these conditions, current from the capacitor C1 flows through the inductor L1 and to ground. Thus, the output voltage Vout1 tends to decrease. A load 10 coupled across the capacitor C1 is powered by the voltage converter.

A first terminal of a resistor R1 is coupled to the first terminal of the capacitor C1. A second terminal of the resistor R1 is coupled to a first terminal of a resistor R2. A second terminal of the resistor R2 is second terminal of the capacitor C1.

The resistors R1 and R2 form a voltage divider, in which a voltage formed at an intermediate node is proportional to the output voltage Vout1. This voltage is coupled to an inverting input of an amplifier 12. A reference voltage Vref1 is coupled to a non-inverting input of the amplifier 12. The amplifier 12 forms an error signal Veao1 that is representative of a difference between the output voltage Vout1 and a desired level for the output voltage Vout1.

The error signal Veao1 is coupled to a non-inverting input of a comparator 14. A periodic ramp signal Vramp1 formed by an oscillator 16 is coupled to an inverting input of the comparator 14. The comparator 14 forms a switch control signal Vsw1 that is coupled to the switch SW1 and to an input of an inverter 18. An output of the inverter 18 is coupled to the switch SW2.

As can be seen from FIG. 1, when the error signal Veao1 is higher than the ramp signal Vramp1, the switch control signal Vsw1 is a logic high voltage. Under these conditions, the switch SW1 is closed and the switch SW2 is open. When the error signal Veao1 is lower than the ramp signal Vramp1, the switch control signal Vsw1 is a logic low voltage. Under these conditions, the switch SW1 is open and the switch SW2 is closed.

The ramp signal Vramp1 rises steadily to a maximum level and then rapidly discharges to a minimum level before the cycle repeats. The error signal Veao1 generally remains between maximum and minimum levels of the ramp signal Vramp1. Thus, for each cycle of the ramp signal Vramp1, the switches SW1 and SW2 cycle between opened and closed.

When the output voltage Vout1 decreases, the error signal Veao1 increases. This increases the duty cycle for the switch SW1 and, thus, increases the output voltage Vout1. When the output voltage Vout1 increases, the error signal Veao1 decreases. This decreases the duty cycle for the switch SW1 and, thus, decreases the output voltage Vout1. Accordingly, the output voltage Vout1 is regulated in a feedback loop.

If the output voltage Vout1 is significantly below the desired level, then the switch SW1 may be closed for a significant portion of the time. As a result, the input current can be of a large magnitude. Further, if the input voltage Vin1 should rise unexpectedly, this can also contribute to a large input current. A large input current may cause damage to elements of the converter, such as the switch SW1. Accordingly, it may be desirable to provide a technique for limiting the input current to the converter.

Therefore, what is needed is a technique for limiting the input current to a voltage converter. It is to these ends that the present invention is directed.

BRIEF SUMMARY OF THE INVENTION

The invention is a current limiting technique for a voltage converter. The level of input current to the converter is determined. If the measured current level is excessive, then switching in the converter may be interrupted or the duty cycle reduced until the current falls to an acceptable level. Because parasitic resistance may be used to detect the input current, rather than a dedicated sensing resistor, fewer components may be required. Thus, implementation of the converter and its associated control circuitry is simplified.

In accordance with one aspect of the invention, a current through a reactive element in a voltage converter is limited. Current from a supply is switched through a reactive element in accordance with a switch control signal for forming a regulated output voltage in a feedback loop. A first signal that is representative of the input current is sensed. A voltage that is representative of the output voltage of the voltage converter is sensed. A second signal that is representative of a difference between the output voltage and a desired voltage is formed. A selected one of the first signal and the second signal is compared to a ramp signal for forming the switch control signal wherein the selected one of the first signal and the second signal is selected according to the relative magnitudes of the first and second signal.

DETAILED DESCRIPTION OF A PREFERRED EMBODIMENT

Figure 1:
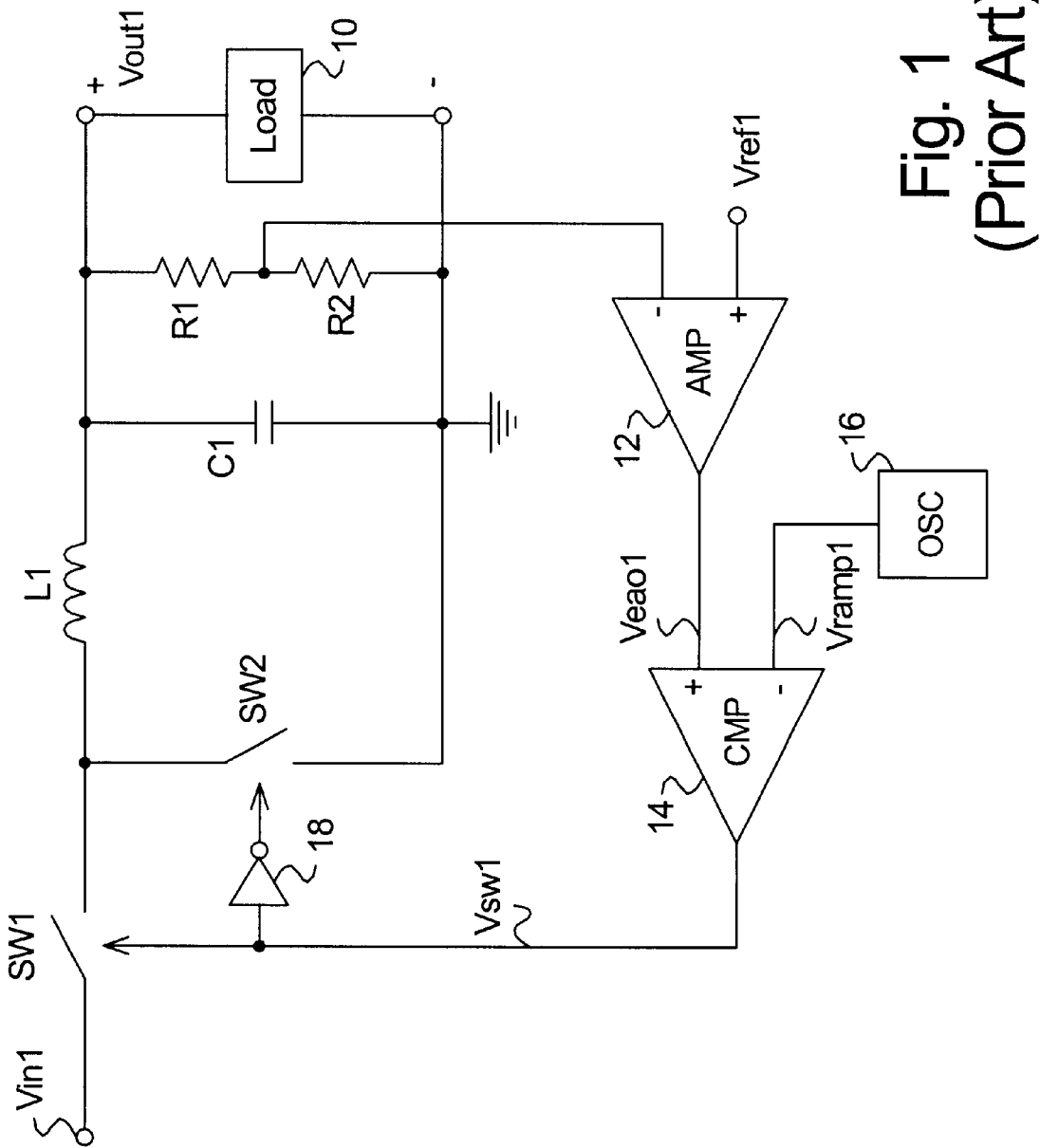
FIG. 1 illustrates a voltage converter of the prior art.
Figure 2:
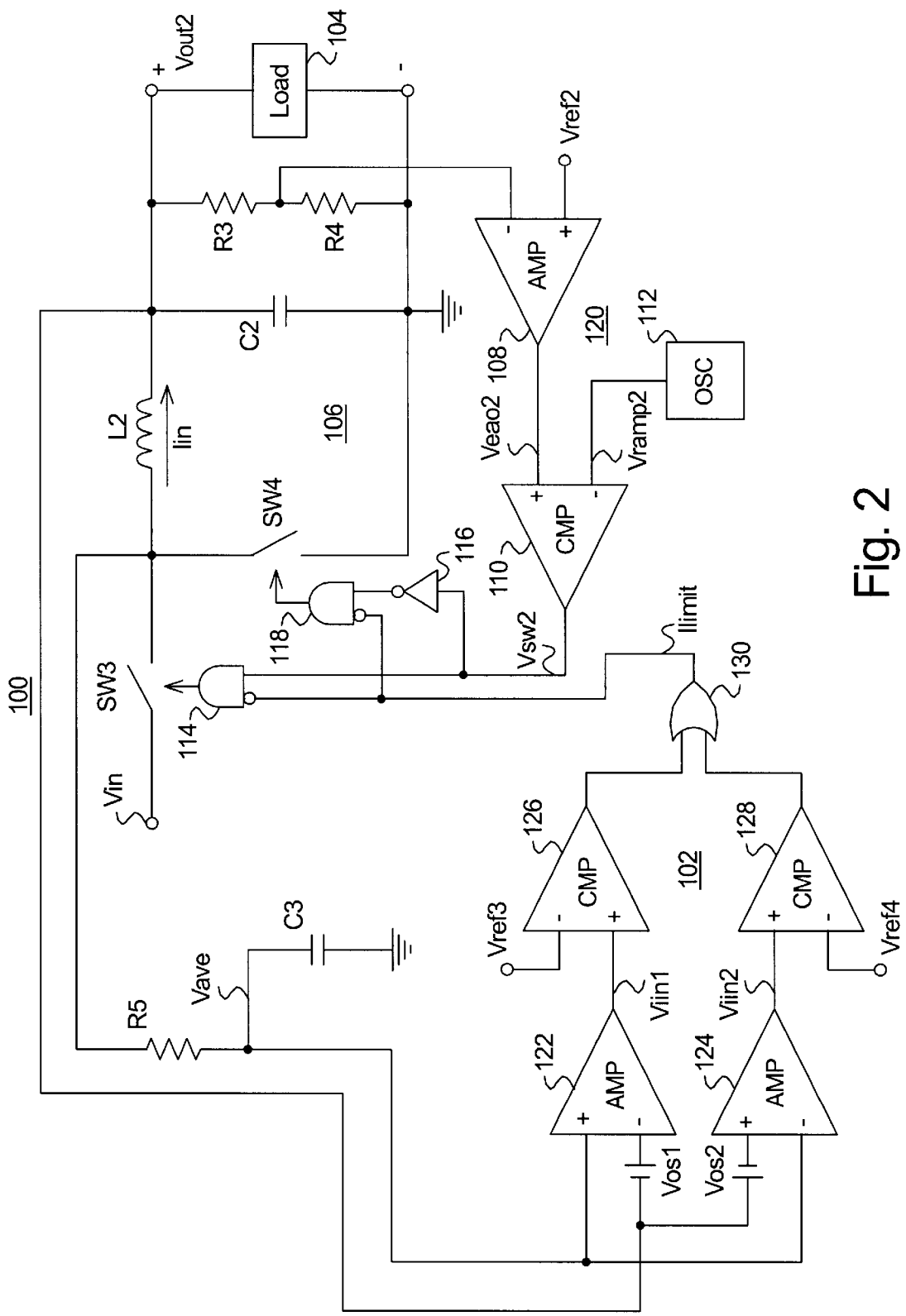
FIG. 2 illustrates a voltage converter including current-limiting circuitry in accordance with an embodiment of the present invention that disables the switching current.

FIG. 2 illustrates a voltage converter 100 including current-limiting circuitry 102 in accordance with the present invention. The voltage converter 100 is coupled to receive power from a power source Vin. The source Vin may be, for example, an unregulated direct-current (DC) supply, such as a battery or a rectified alternating current (AC) signal. The source Vin may be coupled to a first terminal of a switch SW3. A second terminal of the switch SW3 may be coupled to a first terminal of a reactive element, such as an inductor L2. The second terminal of the switch SW3 may also be coupled to a first terminal of a switch SW4. A second terminal of the inductor L2 may be coupled to a first terminal of a reactive element, such as an output capacitor C2. A second terminal of the switch SW4 and a second terminal of the capacitor C2 may be coupled to a ground node.

When the switch SW3 is closed, the switch SW4 is open. Under these conditions, an input current Iin flows from the input source Vin through the inductor L2 and charges the capacitor C2. Thus, an output voltage Vout2 formed across the capacitor C2 tends to increase. When the switch SW3 is open, the switch SW4 is closed. Under these conditions, current from the capacitor C2 flows through the inductor L2 and to ground. Thus, the output voltage Vout2 tends to decrease. A load 104 coupled across the capacitor C2 may be powered by the voltage converter 100.

The switches SW3 and SW4, the inductor L2 and the capacitor C2 form a buck converter power conversion section 106 of the converter 100. It will be apparent that the power conversion section 106 is exemplary and that advantages of the invention may be achieved using a power conversion section 106 that has a different topology from that of FIG. 2. For example, the power conversion section 106 may include a boost converter or another type of buck converter.

A first terminal of a resistor R3 may be coupled to the first terminal of the capacitor C2. A second terminal of the resistor R3 may be coupled to a first terminal of a resistor R4. A second terminal of the resistor R4 may be coupled to a second terminal of the capacitor C2.

The resistors R3 and R4 form a voltage divider, in which a voltage formed at an intermediate node is proportional to the output voltage Vout2. This output voltage sensing signal may be coupled to an inverting input of an amplifier 108. A reference voltage Vref2 may be coupled to a non-inverting input of the amplifier 108. The amplifier 108 forms an error signal Veao2 that is representative of a difference between the output voltage Vout2 and a desired level for the output voltage Vout2.

The error signal Veao2 may be coupled to a non-inverting input of a comparator 110. A periodic ramp signal Vramp2, formed by an oscillator 112, may be coupled to an inverting input of the comparator 110. The comparator 110 may form a switch control signal Vsw2. The switch control signal Vsw2 may be coupled to the switch SW3 via a logic AND gate 114 and to the switch SW4 via an inverter 116 and a logic AND gate 118.

Under normal operating conditions, in absence of an over-current condition, the logic gate 114 passes the switch control signal Vsw2 to the switch SW3 and the logic gate 118 passes the switch control signal Vsw2, as inverted by the inverter 116, to the switch SW4. Thus, when the error signal Veao2 is higher than the ramp signal Vramp2, the switch control signal Vsw2 is a logic high voltage. Under these conditions, the switch SW3 is closed and the switch SW4 is open. When the error signal Veao2 is lower than the ramp signal Vramp2, the switch control signal Vsw2 is a logic low voltage. Under these conditions, the switch SW3 is open and the switch SW4 is closed.

The ramp signal Vramp2 may rise steadily to a maximum level and then rapidly discharge to a minimum level before the cycle repeats. The error signal Veao2 generally remains between maximum and minimum levels of the ramp signal Vramp2. Thus, for each cycle of the ramp signal Vramp2, the switches SW3 and SW4 cycle between opened and closed.

When the output voltage Vout2 decreases, the error signal Veao2 increases. This increases the duty cycle for the switch SW3 and, thus, increases the output voltage Vout2. When the output voltage Vout2 increases, the error signal Veao2 decreases. This decreases the duty cycle for the switch SW3 and, thus, decreases the output voltage Vout2. Accordingly, the output voltage Vout2 is regulated in a feedback loop. The output voltage Vout2 may be adjusted by adjusting the level of the reference voltage Vref2 or the values of the resistors R3 or R4.

The resistors R3 and R4, the amplifier 108, the comparator 110, oscillator 112 and inverter 116 form a control section 120 of the converter 100. It will be apparent that the control section 120 is exemplary and that advantages of the invention may be achieved using a control section 120 that differs from that of FIG. 2. For example, input polarities of the amplifier 108 and/or comparator 110 may be exchanged. As another example, additional elements may be added, such as a latch that forms the switch control signal Vsw2 based upon the output of the comparator 110 and a clock signal that is synchronous with the ramp signal Vramp2.

The current limiting section 102 of the converter 100 may include a resistor R5 and a capacitor C3. A first terminal of the resistor R5 may be coupled to the first terminal of the inductor L2. A second terminal of the resistor R5 may be coupled to a first terminal of a capacitor C3. A second terminal of the capacitor C3 may be coupled to the ground node. The resistor R5 and capacitor C3 form an R-C low-pass filter, in which a signal Vave formed at the node between the resistor R5 and the capacitor C3 is representative of an average level of input voltage applied to the first terminal of the inductor L2. Values for the resistor R5 and capacitor C3 are preferably selected such that the signal Vave is representative of an average of the voltage applied to the first terminal of the inductor L2 over time period of between a few and several cycles of the switch control signal Vsw2.

The current limiting section 102 may also include offset voltage sources Vos1, Vos2, amplifiers 122, 124, comparators 126, 128 and logic gate 130. The signal Vave may be coupled to a non-inverting input of the amplifier 122 and to an inverting input of the amplifier 124. The second terminal of the inductor L2 may be coupled to a first terminal of the offset voltage source Vos1 and to a first terminal of the offset voltage source Vos2. A second terminal of the offset voltage source Vos1 may be coupled to an inverting input of the amplifier 122, while a second terminal of the offset voltage source Vos2 may be coupled to a non-inverting input of an amplifier 124. The amplifier 122 may form a signal Viin1 at its output, while the amplifier 124 may form a signal Viin2 at its output.

An exemplary value for the parasitic resistance of the inductor L2 is 50 milliohms. An exemplary steady-state current drawn by the load 104 and, thus, the average current Iin through the inductor L2, is 10 amps. Accordingly, the expected voltage drop across the parasitic resistance of the inductor L2 may be equal to 500 millivolts (50 milliohms× 10 amps). Based on these exemplary values, the offset voltage source Vos1 may be selected to be 500 millivolts, for example, while the offset voltage source Vos2 may be selected to be −500 millivolts, for example.

When the load 104 is drawing steady-state current, the average of the input current Iin is flowing in a forward direction, i.e. from the first terminal of the inductor L2 to the second terminal of the inductor L2. Under these conditions, the signal Vave may be expected to be approximately 500 millivolts higher than the level at the second terminal of the inductor L2 due to the voltage drop across the parasitic resistance of the inductor L2. The offset voltage source Vos1 may increase the signal level at the second terminal of the inductor L2 by approximately 500 millivolts. As such, the voltage differential applied across inputs of the amplifier 122 is approximately zero volts. Accordingly, the signal Viin1 is representative of a level of current flowing through the inductor L2 in the forward direction and is expected to be approximately zero volts.

Under these conditions, the signal Viin2 is representative of a level of current flowing through the inductor L2 in the reverse direction and is expected to be a negative value below zero. This is because the signal Vave coupled to the inverting input of the amplifier 124 is expected to be approximately 500 millivolts higher than the voltage at the second terminal of the inductor L2 due to the voltage drop across the inductor L2. The offset voltage source Vos2 reduces the signal level at the non-inverting input of the amplifier 124. As such, the non-inverting input is expected to be approximately 1000 millivolts (1 volt) lower than the voltage at the inverting input.

The signal Viin1 at the output of the amplifier 122 may be coupled to a non-inverting input of the comparator 126. A reference voltage Vref3 may be coupled to an inverting input of the comparator 126. The signal Viin2 at the output of the amplifier 124 may be coupled to a non-inverting input of the comparator 128. A reference voltage Vref4 may be coupled to an inverting input of the comparator 128. Thus, under the above-described conditions in which the load 104 draws a steady-state current, the signal Viin1 may be below the level of Vref3, while the signal Viin2 may be below the level of Vref4. Accordingly, the outputs of the comparators 126 and 128 may both be a logic low voltage.

The output of the comparator 126 may be coupled to a first input of a logic OR gate 130, while the output of the comparator 128 may be coupled to a second input of the logic OR gate 130. The logic OR gate 130 may form a current-limiting signal Ilimit at its output. When the outputs of the comparators 126 and 128 are both a logic low voltage, then the signal Ilimit may also be a logic low voltage. Accordingly, the AND gate 114 passes the switch control signal Vsw2 to the switch SW3 and the logic AND gate 118 passes the inverted switch control signal Vsw2 to the switch SW4. Thus, when the signal Ilimit is logic low voltage, switching in the voltage converter section 106 is enabled.

Should the average current Iin through the inductor L2 exceed its steady-state level, the level of Vave rises. As a result, the signal Viin1 at the output of the amplifier 122 rises. Eventually, the signal Viin1 may exceed the level of Vref3, which may be set to a level representative of a maximum allowable current so as to avoid damaging elements of the converter 100. When this occurs, the output of the comparator 126 may transition to a logic high voltage, which causes the signal Ilimit to transition to a logic high voltage. As a result, the switches SW3 and SW4 may both be held open until the input current Iin falls sufficiently to cause the signal Viin1 to fall below the level of Vref3. When the input current falls sufficiently, the signal Ilimit may return to a logic low voltage and switching of the switches SW3 and SW4 may resume. Thus, when the signal Ilimit is logic high voltage, switching in the voltage converter section 106 may be disabled.

Thus, a technique for limiting the input current Iin in the power conversion section 106 has been described, in which the input current Iin is sensed by monitoring an average voltage across the inductor L2. It will be apparent that the circuitry by which switching is disabled, e.g., current limiting section 102 and logic AND gates 114 and 118, may be altered from that shown in FIG. 2, while still achieving the principal objects of the invention. For example, hysteresis may be employed in the comparator 126 so as to cause the current Iin in the inductor L2 to fall to a level that is a predetermined amount below the reference level before re-enabling switching of the switches SW3 and SW4. Such hysteresis may reduce the frequency in which the input current Iin is interrupted. As another example, rather than disabling switching entirely in response to an over-current condition, switching may be resumed at a reduced duty-cycle to limit the input current Iin, such as a predetermined minimum duty cycle. This may be achieved by setting the error signal Veao2 to a predetermined level in response to the signal Ilimit transitioning to a logic high voltage.

Further, under conditions where the output voltage Vout2 exceeds the predetermined desired level, the average input current Iin may be in the reverse direction, i.e. from the second terminal of the inductor L2 to the first terminal of the inductor L2. As a result, the voltage at the second terminal of the inductor L2 may exceed the signal Vave due to the parasitic resistance of the inductor L2. For example, the voltage at the second terminal of the inductor L2 may exceed the signal Vave by 500 millivolts, assuming a reverse current through the inductor L2 of 10 amps.

Under these conditions, the signal Viin1 is expected to be a negative value below zero. This is because the signal Vave coupled to the non-inverting input of the amplifier 122 is expected to be approximately 500 millivolts lower than the voltage at the second terminal of the inductor L2 due to the voltage drop across the inductor L2. The offset voltage source Vos1 increases the signal level at the inverting input of the amplifier 122. As such, the inverting input is expected to be approximately 1000 millivolts (1 volt) higher than the voltage at the non-inverting input.

However, the signal Viin2 is expected to be around zero volts. This is because the signal Vave may be expected to be approximately 500 millivolts lower than the level at the second terminal of the inductor L2 due to the voltage drop across the parasitic resistance of the inductor L2. The offset voltage source Vos2 may decrease the signal level at the second terminal of the inductor L2 by approximately 500 millivolts. As such, the voltage differential applied across inputs of the amplifier 124 is approximately zero volts.

Should the average reverse current Iin through the inductor L2 continue to rise, the signal Viin2 at the output of the amplifier 124 rises. Eventually, the signal Viin2 may exceed the level of Vref4, which may be set to a level representative of a maximum allowable reverse current so as to avoid damaging elements of the converter 100. When this occurs, the output of the comparator 128 may transition to a logic high voltage, which causes the signal Ilimit to transition to a logic high voltage. As a result, the switches SW3 and SW4 may be inhibited from switching until the reverse current Iin falls sufficiently to cause the signal Viin2 to fall below the level of Vref4. When the input current falls sufficiently, the signal Ilimit may return to a logic low voltage and switching of the switches SW3 and SW4 may resume.

Thus, a technique for limiting the input current Iin flowing in the reverse direction in the power conversion section 106 by monitoring an average voltage across the inductor L2 has been described. Hysteresis may also be employed in the comparator 128 so as to cause the current Iin in the inductor L2 to fall to a level that is a predetermined amount below the reference level before re-enabling switching of the switches SW3 and SW4.

Figure 3:
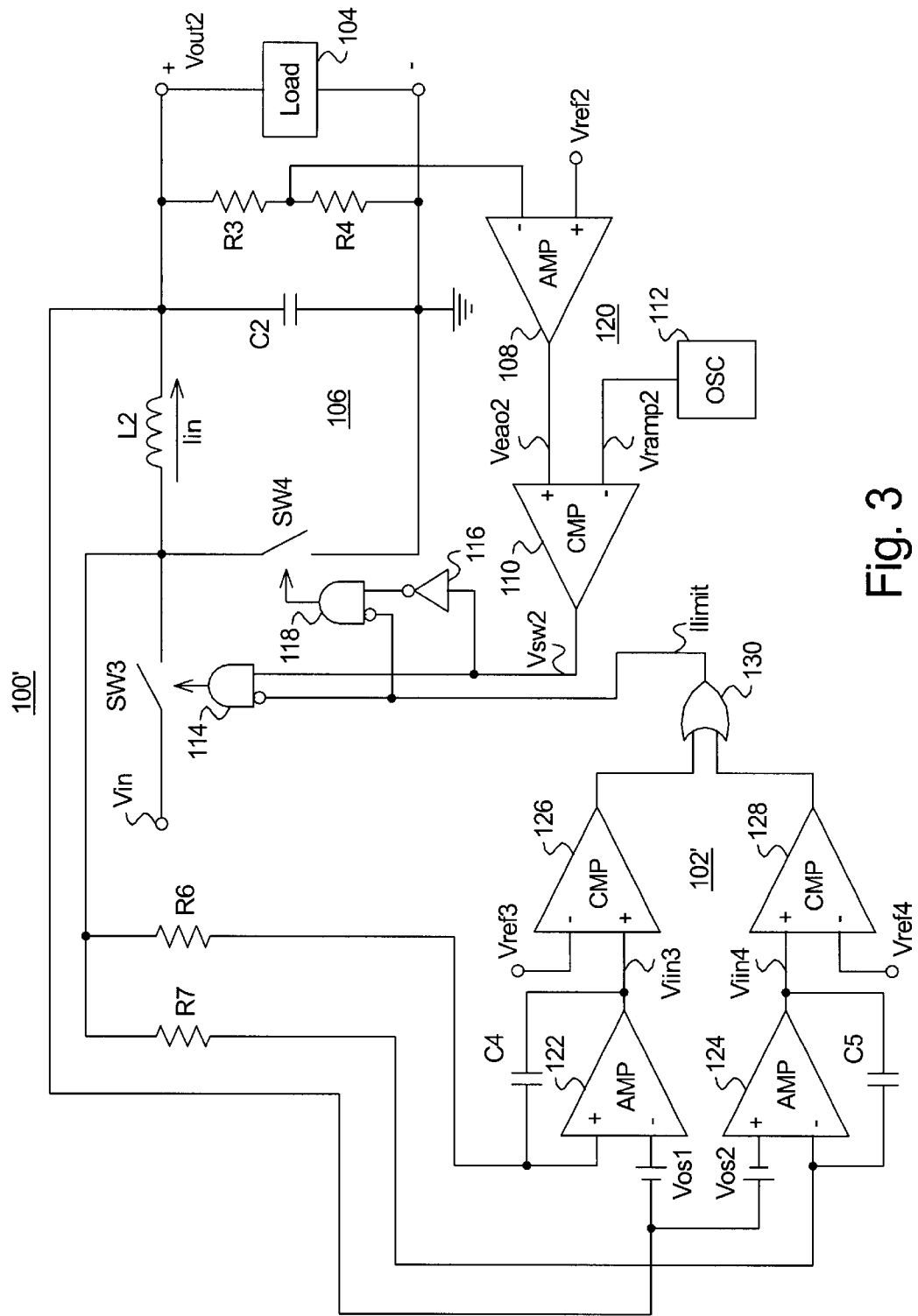
FIG. 3 illustrates a voltage converter including an alternate embodiment of current-limiting circuitry in accordance with the present invention.

FIG. 3 illustrates a voltage converter 100' including an alternate embodiment of current-limiting circuitry 102' in accordance with the present invention. As shown in FIG. 3, the current limiting section 102' may include offset voltage sources Vos1, Vos2, resistors R6, R7, capacitors C4, C5, amplifiers 122, 124, comparators 126, 128 and logic gate 130. A first terminal of the resistor R6 and a first terminal of the resistor R7 may be coupled to the first terminal of the inductor L2.

A second terminal of the resistor R6 may be coupled to the non-inverting input of the amplifier 122 and to a first terminal of the capacitor C4. The output terminal of the amplifier 122 may form a signal Viin3 and may be coupled to a second terminal of the capacitor C4. The second terminal of the inductor L2 may be coupled to a first terminal of the offset voltage source Vos1 and to a first terminal of the offset voltage source Vos2. A second terminal of the source Vos1 may be coupled to the inverting input terminal of the amplifier 122.

Accordingly, the amplifier 122 may be configured as an integrator or low-pass filter. As such, the signal Viin3 may be representative of an average voltage across the inductor L2, offset by the source Vos1. Thus, the signal Viin3 may be representative of a level of current flowing in the inductor L2 in the forward direction. Under exemplary steady-state conditions where the load 104 draws 10 amps of current and the offset source Vos1 is approximately equal to a voltage expected across parasitic resistance of the inductor L2, i.e. 500 millivolts, the signal Viin3 is expected to be approximately zero volts.

The signal Viin3 may be coupled to a non-inverting input of the comparator 126, while the reference voltage Vref3 may be coupled to an inverting input of the comparator 126. Thus, under the above-described conditions in which the load 104 draws a steady-state current, the signal Viin3 may be below the level of Vref3. However, should the input current Iin rise, then the signal Viin3 may also rise. Eventually, the signal Viin3 may exceed a level of Vref3. In which case, the output of the comparator 126 may transition to a logic high voltage. As a result, the current-limiting signal Ilimit may also transition to a logic high voltage, inhibiting switching of the switches SW3 and SW4 until the input current Iin falls sufficiently that the output of the comparator 126 returns to a logic low voltage.

Similarly, a second terminal of the resistor R7 may be coupled to the inverting input of the amplifier 124 and to a first terminal of the capacitor C5. The output terminal of the amplifier 124 may form a signal Viin4 and may be coupled to a second terminal of the capacitor C5. A second terminal of the offset voltage source Vos2 may be coupled to the inverting input terminal of the amplifier 124.

Accordingly, the amplifier 124 may be configured as an integrator or low-pass filter. As such, the signal Viin4 may be representative of an average voltage across the inductor L2, offset by the source Vos2. Thus, the signal Viin4 may be representative of a level of current flowing the inductor L2 in the reverse direction. Under exemplary reverse-current conditions where 10 amps of current flows from the second terminal of the inductor L2 to the first terminal of the inductor L2, the signal Viin4 is expected to be approximately zero volts.

The signal Viin4 may be coupled to a non-inverting input of the comparator 128, while the reference voltage Vref4 may be coupled to an inverting input of the comparator 128. Thus, under the above-described conditions, the signal Viin4 may be below the level of Vref4. However, should the reverse current Iin rise, then the signal Viin4 may also rise. Eventually, the signal Viin4 may exceed a level of Vref4. In which case, the output of the comparator 128 may transition to a logic high voltage. As a result, the current-limiting signal Ilimit may also transition logic high voltage, inhibiting switching of the switches SW3 and SW4 until the reverse current Iin falls sufficiently that the output of the comparator 128 returns to a logic low voltage.

Thus, an alternate technique for limiting the input current Iin in the power conversion section 106 has been described, in which the input current Iin is sensed by monitoring an average voltage across the inductor L2. It will be apparent that the circuitry by which switching is inhibited, e.g., current limiting section 102' and logic AND gates 114 and 118, may be altered from that shown in FIG. 3, while still achieving the principal objects of the invention. For example, hysteresis may be employed in the comparators 126 and 128 so as to cause the current Iin in the inductor L2 to fall to a level that is somewhat below the predetermined level before re-enabling switching of the switches SW3 and SW4. As another example, rather than disabling switching entirely in response to an over-current condition, switching may be resumed at a reduced duty-cycle, such as a predetermined minimum duty cycle.

Figure 4:
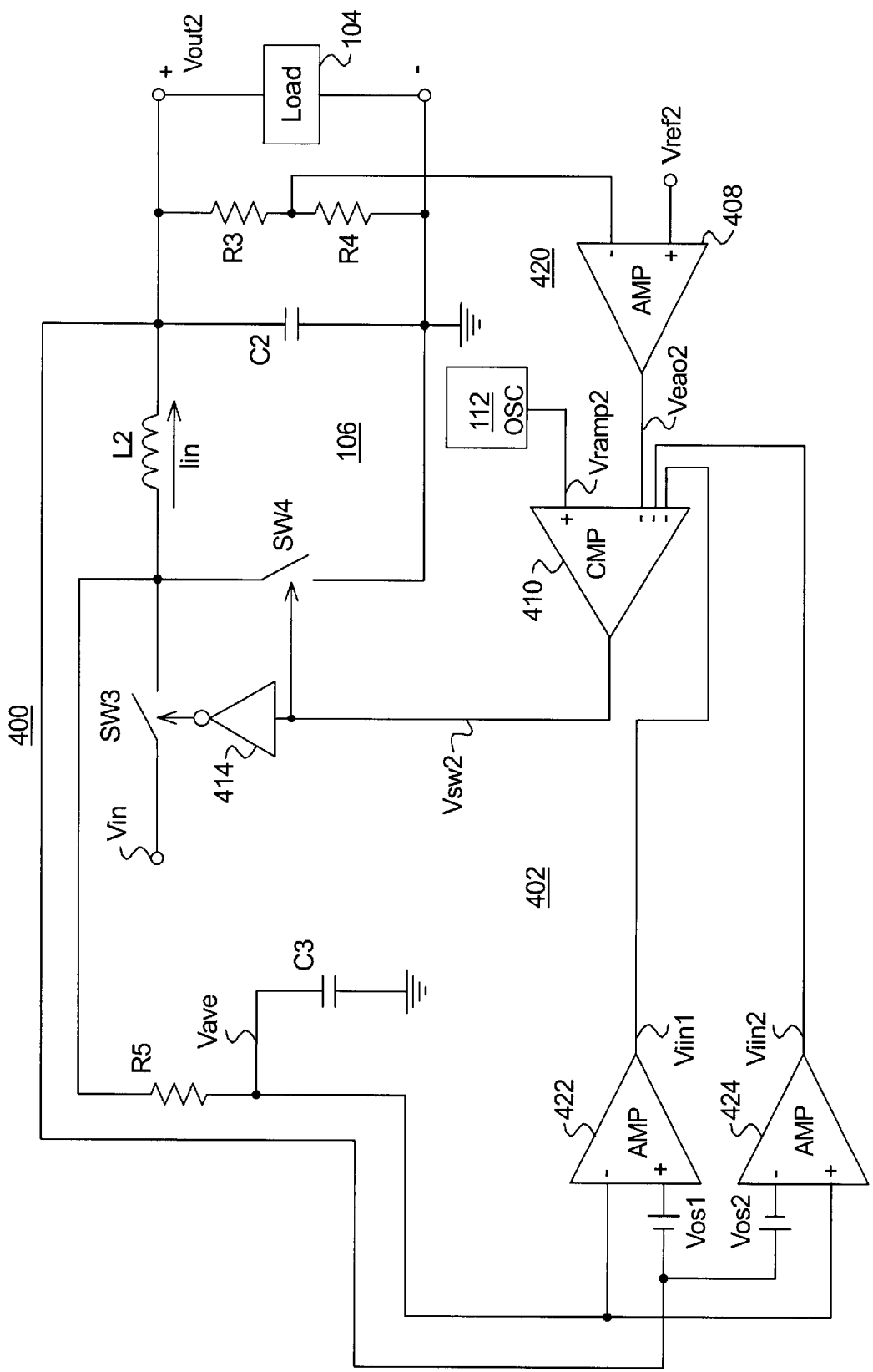
FIG. 4 illustrates a voltage converter including current-limiting circuitry in accordance with an embodiment of the present invention that decrease the duty cycle.

FIG. 4 illustrates a voltage converter 400 including an alternate embodiment of current-limiting circuitry 402 in accordance with the present invention.

The resistors R3 and R4 form a voltage divider, in which a voltage formed at an intermediate node is proportional to the output voltage Vout2. This output voltage signal may be coupled to an inverting input of an amplifier 408. A reference voltage Vref2 may be coupled to a non-inverting input of the amplifier 408. The amplifier 408 forms an error signal Veao2 that is representative of a difference between the output voltage Vout2 and a desired level for the output voltage Vout2.

The error signal Veao2 may be coupled to a first inverting input of multi-input comparator 410. A periodic ramp signal Vramp2, formed by an oscillator 112, may be coupled to a non-inverting input of the comparator 410. The comparator 410 may form a switch control signal Vsw2. The switch control signal Vsw2 may be coupled to a switch SW4 and to an input of inverter 414. The output of inverter 414 may be coupled to a switch SW3.

A control section 420 of the converter 400 may include: the resistor R3; the resistor R4; the amplifier 408; the multi-input comparator 410; the oscillator 112; and the inverter 414. It will be apparent that the voltage control section 420 is exemplary and that advantages of the invention may be achieved by using control section 420 that differs from that of FIG. 4. For example, input polarities of the amplifier 408 and/or comparator 410 may be exchanged. As another example, additional elements may be included, such as a latch that forms the switch control signal Vsw2 based upon the output of the comparator 410 and a clock signal that is synchronous with the ramp signal Vramp2.

The current limiting section 402 may include: a resistor R5; a capacitor C3; a offset voltage source Vos1; a offset voltage source Vos2, an amplifier 422; an amplifier 424; the multi-input comparator 410, and the inverter 414. The comparator 410 and the inverter 414 maybe shared with the voltage control section 420.

The signal Vave that is representative of the input current may be coupled to an inverting input of the amplifier 422 and to a non-inverting input of the amplifier 424. The second terminal of the inductor L2 may be coupled to a first terminal of the offset voltage source Vos1 and to a first terminal of the offset voltage source Vos2. A second terminal of the offset voltage source Vos1 may be coupled to a non-inverting input of the amplifier 422. A second terminal of the offset voltage source Vos2 may be coupled to an inverting input of an amplifier 424. The amplifier 422 may form a signal Viin1 at its output, while the amplifier 424 may form a signal Viin2 at its output. The signal Viin1 is representative of the forward current passing through the inductor L2 relative to the offset voltage Vos1. The signal Viin2 is representative of the reverse current passing through the inductor relative to the offset voltage Vos2. It will be apparent that the circuitry by which a current passing through the inductor L2 is measured may be altered from that shown in FIG. 4 and still achieve the principal objects of the invention. For example, a sensing resistor in series with the inductor L2 may be used to measure the current passing through the inductor L2.

The signal Viin1 at the output of the amplifier 422 may be coupled to a second inverting input of the comparator 410. If the reverse current is to be monitored, the signal Viin2 at the output of the amplifier 424 may be coupled to a third inverting input of the comparator 410.

Multi-input comparator 410 may operate such that whichever inverted input is the lowest is compared to the non-inverted input for controlling its output. Thus, when the lowest inverted input is higher than the non-inverted input then the output of the multi-input comparator 410 is a logic low voltage. Also, when the lowest inverted input is lower than the non-inverted input then the output of the multi-input comparator 410 is a logic high voltage.

Thus, whenever a lowest one of Veao2, Viin1, and Viin2 is higher than the ramp signal Vramp2, the switch control signal Vsw2 is a logic low voltage. Under these conditions, the switch SW3 is closed and the switch SW4 is open. Whenever a lowest one of Veao2, Viin1, and Viin2 is lower than the ramp signal Vramp2, the switch control signal Vsw2 is a logic high voltage. Under these conditions, the switch SW3 is open and the switch SW4 is closed.

The ramp signal Vramp2 may rise steadily to a maximum level and then rapidly discharge to a minimum level before the cycle repeats. The error signal Veao2 generally remains between maximum and minimum levels of the ramp signal Vramp2. Thus, for each cycle of the ramp signal Vramp2, the switches SW3 and SW4 cycle between opened and closed. Thus, under normal operating conditions in the absence of an overcurrent condition, the duty cycle of the switch SW3 (and the switch SW4) is controlled in a feedback loop based on the error signal Veao2 so as to maintain the output voltage Vout at its desired level.

When an overcurrent condition occurs, either Viin2 or Viin1 will be less than Veao2. This will cause the duty cycle of Vsw3 to decrease. Decreasing the duty cycle of the switch SW3 tends to reduce the input current. As the current in the inductor L2 increases, the switching duty cycle is gradually reduced (via the switch control signal Vsw3). This technique allows the voltage regulator to gradually decrease the duty cycle and, thus, the input current is reduced when the input current is excessive. This is in contrast to the embodiments of FIGS. 2 and 3 in which switching is disabled when the input current is excessive. However, if Viin2 or Viin1 are less then the minimum ramp signal level 112, or otherwise fall outside the ramp signal maximum and minimum levels, then the input incurrent may be inhibited by disabling switching.

In an alternate embodiment, the switching duty cycle is set to a minimum value instead of disabling it completely when Viin2 or Viin1 reach a predetermined level. This may be accomplished, for example, by constraining the levels of Viin2 and Viin1.

Thus, a technique for limiting the input current Iin in the power conversion section 106 has been described, in which the input current Iin is sensed by monitoring an average voltage across the inductor L2 or through other ways of sensing the input current (e.g. series resistor). It will be apparent that the circuitry by which switching is limited, e.g., current limiting section 402, may be altered from that shown in FIG. 4, while still achieving the principal objects of the invention.

Figure 5:
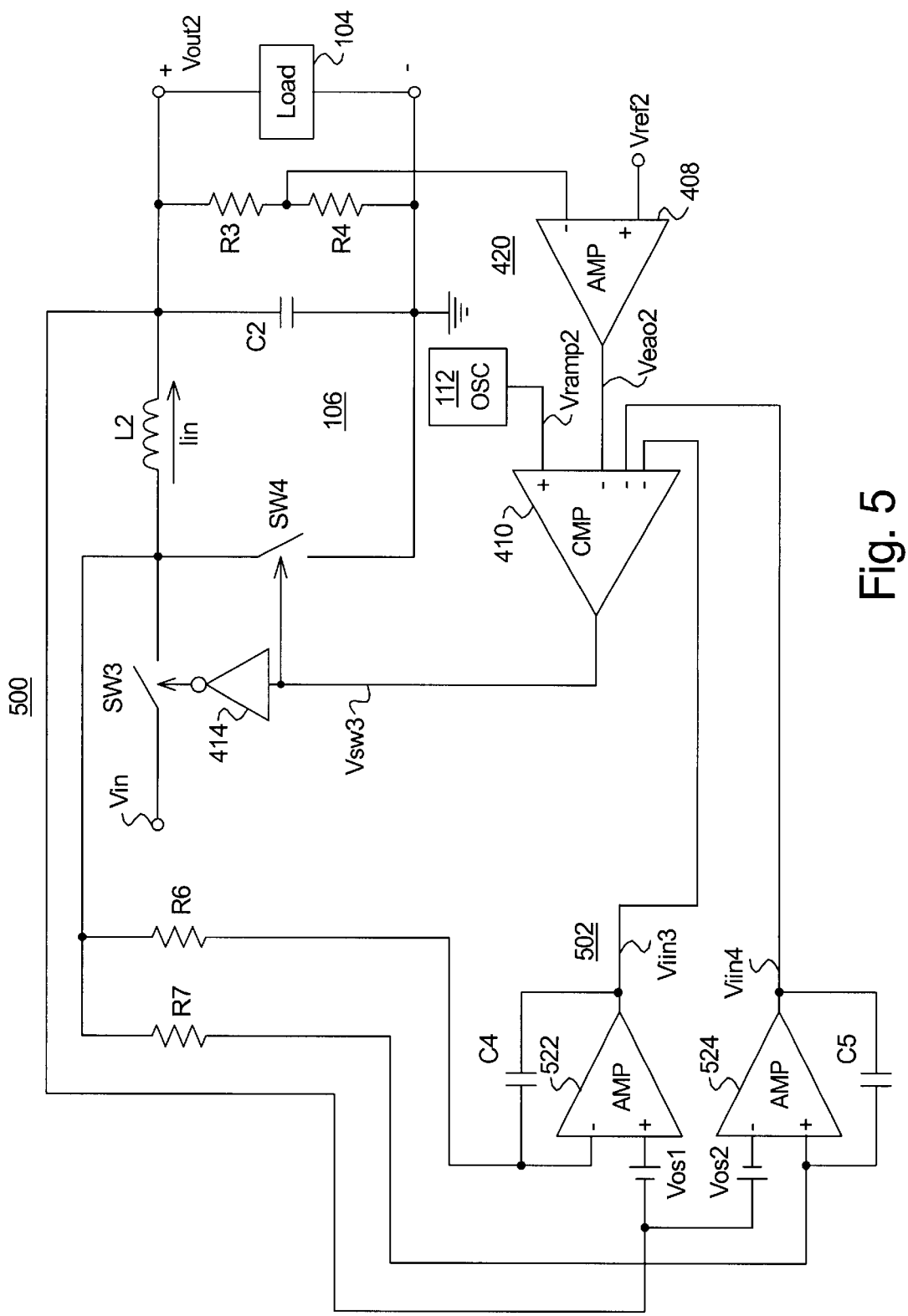
FIG. 5 illustrates a voltage converter including an alternate embodiment of current-limiting circuitry in accordance with an embodiment of the present invention that decrease the duty cycle.

FIG. 5 illustrates a voltage converter 500 including an alternate embodiment of a current-limiting circuitry 502 in accordance with the present invention. As shown in FIG. 5, the current limiting section 502 may include: the offset voltage source Vos1; the offset voltage source Vos2; a resistor R6; a resistor R7; a capacitor C4; a capacitor C5; an amplifier 522; an amplifier 524, a multi-input comparator 410, the inverter 414. The comparator 410 and the inverter 414 maybe shared with the voltage control section 420.

A first terminal of the resistor R6 and a first terminal of the resistor R7 may be coupled to a first terminal of the inductor L2. A second terminal of the resistor R6 may be coupled to an inverting input of the amplifier 522 and to a first terminal of the capacitor C4. A second terminal of the inductor L2 may be coupled to a first terminal of the offset voltage source Vos1 and to a first terminal of the offset voltage source Vos2. A second terminal of the source Vos1 may be coupled to an non-inverting input terminal of the amplifier 522. An output terminal of the amplifier 522 may be coupled to a second terminal of the capacitor C4. An output terminal of the amplifier 522 may form the signal Viin3.

Accordingly, the amplifier 522 may be configured as an integrator or low-pass filter. As such, the signal Viin3 may be representative of an average voltage across the inductor L2, offset by the source Vos1. Thus, the signal Viin3 may be representative of a level of current flowing through the inductor L2 in the forward direction. The signal Viin3 may be coupled to the second inverting input of multi-input comparator 410.

Similarly, a second terminal of the resistor R7 may be coupled to a non-inverting input of the amplifier 524 and to a first terminal of the capacitor C5. A second terminal of the offset voltage source Vos2 may be coupled to an inverting input terminal of the amplifier 524. The output terminal of the amplifier 524 may be coupled to a second terminal of the capacitor C5. The output terminal of the amplifier 524 may form a signal Viin4.

Accordingly, the amplifier 524 may be configured as an integrator or low-pass filter. As such, the signal Viin4 may be representative of an average voltage across the inductor L2, offset by the source Vos2. Thus, the signal Viin4 may be representative of a level of current flowing through the inductor L2 in the reverse direction. The signal Viin4 may be coupled to an inverting input of multi-input comparator 510.

The voltage control section 420 of FIG. 5 may be the same as in FIG. 4. When an overcurrent condition occurs, either Viin3 or Viin4 will be less than Veao2. This will cause the duty cycle of Vsw3 to decrease. Decreasing the duty cycle of the switch SW3 tends to reduce the input current. As the current in the inductor increases, the switching duty cycle will be gradually reduced (via the switch control signal Vsw3). This technique allows the voltage regulator to gradually decrease the duty cycle and, thus, the input current is reduced when the input current is excessive. This is in contrast to the embodiments of FIGS. 2 and 3 in which the switching is disabled when the current is excessive. However, if Viin3 or Viin4 are less then the minimum ramp signal level 112, or otherwise fall outside the ramp signal maximum and minimum levels, then the input current may be inhibited by disabling switching.

Similarly to the embodiment of FIG. 4, in an alternate embodiment of FIG. 5, the switching duty cycle may be set to a minimum value instead of disabling it completely.

Thus, a technique for limiting the input current Iin in the power conversion section 106 has been described, in which the input current in is sensed by monitoring an average voltage across the inductor L2 or through another way of sensing the input current (e.g. series resistor). It will be apparent that the circuitry by which switching is limited, e.g., current limiting section 502, may be altered from that shown in the figures while still achieving the principal objects of the invention.

Figure 6:
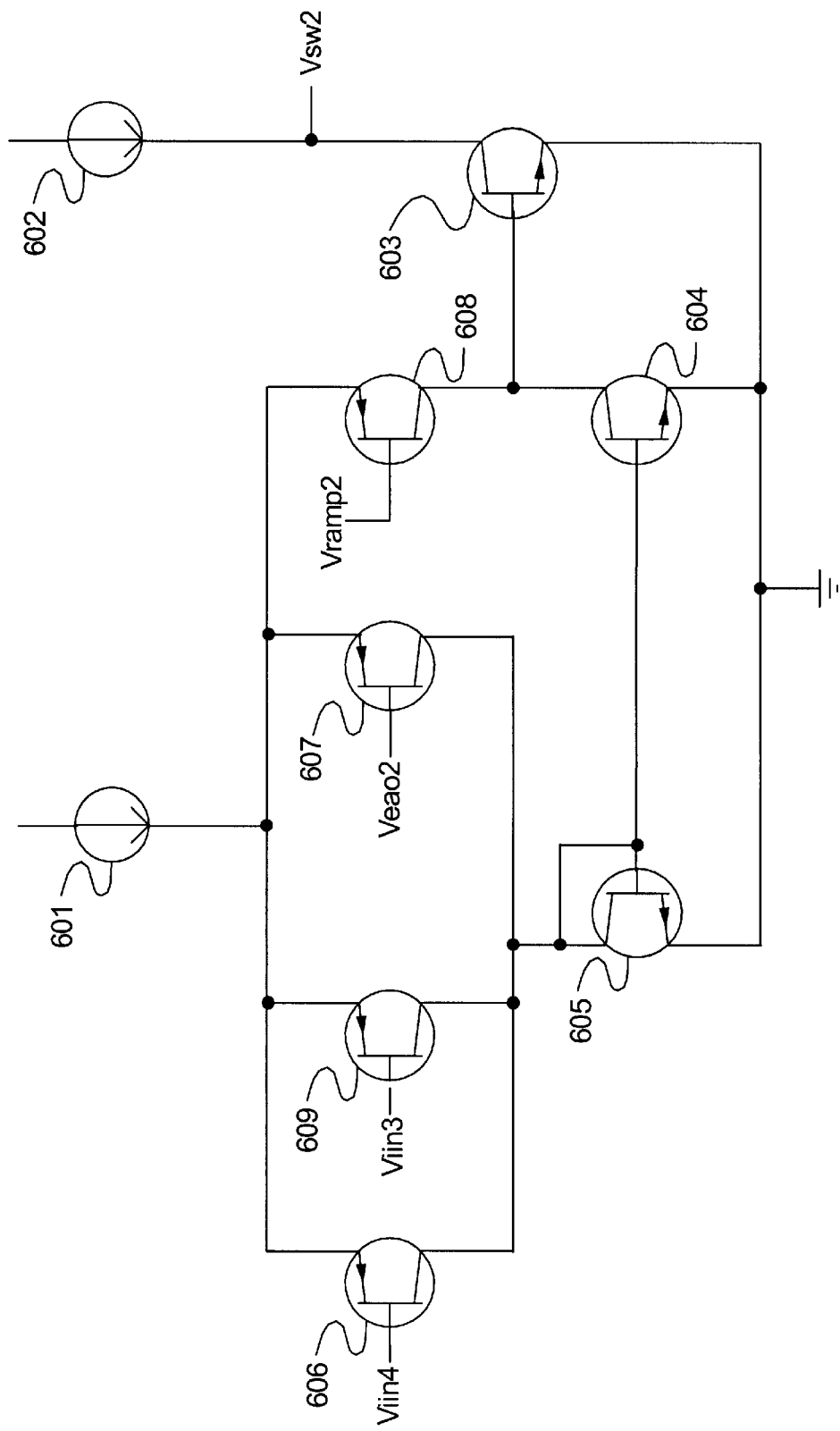
FIG. 6 illustrates an exemplary implementation of a multi-input comparator in accordance with an aspect of the present invention.

FIG. 6 illustrates an exemplary implementation of the multi-input comparator 410 of FIGS. 5 and 6. An output of a current source 601 may be coupled to: an emitter of pnp transistor 606; an emitter of pnp transistor 607; an emitter of pnp transistor 608; and an emitter of pnp transistor 609. An output of a current source 602 may be coupled to the collector of an npn transistor 603 and to an output of the comparator 410, which forms the switch control signal Vsw2. An inverted input that receives the signal Viin4 may be coupled to the base of the pnp transistor 606. An inverted input that receives the signal Viin3 may be coupled to the base of pnp transistor 609. An inverted input that receives the signal Veao2 may be coupled to the base of pnp transistor 607. A non-inverted input Vramp2 may be coupled to the base of pnp transistor 608. The collectors of pnp transistors 606, 607 and 609 may be tied together and coupled to a collector and a base of an npn transistor 605 and to a base of an npn transistor 604. A collector of the pnp transistor 608 may be coupled to a base of the npn transistor 603 and to a collector of the npn transistor 604. The emitters of the npn transistors 603, 604 and 605 may be tied ground.

The output Vsw2 is a logic high voltage when the Vramp2 input is greater than the lowest one of Viin3, Viin4 and Veao2. Vsw2 is a logic low voltage when the Vramp2 input is lower than the lowest one of Viin3, Viin4 and Veao2.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of limiting a current through a reactive element in a voltage converter, comprising:

switching current from a supply through a reactive element in accordance with a switch control signal for forming a regulated output voltage in a feedback loop;

sensing a first signal that is representative of a current passing through the reactive element in a first direction;

sensing a voltage that is representative of the output voltage of the voltage converter;

forming a second signal that is representative of a difference between the output voltage and a desired voltage;

forming a third signal that is representative of a level of current passing through the reactive element in a second direction opposite the first direction; and comparing a selected one of the first, second and third signals to a ramp signal for forming the switch control signal wherein the selected one is selected according to the relative magnitudes of the first, second and third signals.

2. An apparatus for limiting current through a reactive element in a voltage converter, comprising:

a switch coupled to a first terminal of a reactive element for switching current from a supply through the reactive element in accordance with a switch control signal, the switch control signal for forming a regulated output voltage in a feedback loop;

a filter for forming a first signal coupled to a first terminal of the reactive element;

an amplifier having a first input terminal coupled to receive the first signal and a second input terminal coupled to receive a second signal that is representative of a voltage at a second terminal of the reactive element wherein the first amplifier forms a third signal that is representative of a level of current flowing through the reactive element;

sensing a voltage that is representative of the output voltage of the voltage converter;

forming a fourth signal that is representative of a difference between the output voltage and the desired voltage;

a comparator for comparing the third and fourth signal to a ramp signal, wherein the comparator forms a fifth signal; and the fifth signal is used to control the switch.

3. The apparatus according to claim 2, wherein the first signal is representative of an average voltage over a time period of several cycles of the switch control signal.

4. The method according to claim 2, wherein said fifth signal is set to a minimum duty cycle whenever the said third signal exceeds a set value.

5. An apparatus for limiting current through a reactive element in a voltage converter, comprising:

a switch coupled to a first terminal of a reactive element for switching current from a supply through the reactive element in accordance with a switch control signal for forming a regulated output voltage in a feedback loop;

an amplifier having a first input terminal coupled to receive a first signal from the first terminal of the reactive element and a second input terminal coupled to receive a second signal that is representative of a voltage at a second terminal of the reactive element wherein the amplifier functions as a low pass filter with respect to the first signal and forms a third signal at its output that is representative of a level of current flowing through the reactive element;

sensing a voltage that is representative of the output voltage of the voltage converter;

forming a fourth signal that is representative of a difference between the output voltage and the desired voltage;

a comparator for comparing a third and fourth signal formed by the amplifier to a ramp signal, wherein the comparator forms a fifth signal; and control circuitry for controlling the switching of the switch in response to the fifth signal.

6. The apparatus according to claim 5, wherein the third signal is representative of an average voltage over a time period of several cycles of the switch control signal.

7. An apparatus for limiting current through a reactive element in a voltage converter, comprising:

a switch coupled to a reactive element for switching current from a supply through the reactive element in accordance with a switch control signal for forming a regulated output voltage in a feedback loop;

a filter for forming a first signal coupled to a first terminal of the reactive element;

a first amplifier having a first input terminal coupled to receive the first signal and a second input terminal coupled to receive a second signal that is representative of a voltage at a second terminal of the reactive element wherein the second signal is offset from the voltage at the second terminal of the reactive element by a first offset voltage level and wherein the first amplifier forms a third signal that is representative of a level of current flowing through the reactive element in a first direction;

a second amplifier having a first input terminal coupled to receive the first signal and a second input terminal coupled to receive a fifth signal that is representative of a voltage at the second terminal of the reactive element wherein the fourth signal is offset from the voltage at the second terminal of the reactive element by a second offset voltage level and wherein the second amplifier forms a fifth signal that is representative of a level of current flowing through the reactive element in a second direction opposite the first direction;

sensing a voltage that is representative of the output voltage of the voltage converter;

forming a sixth signal that is representative of a difference between the output voltage and the desired voltage;

a comparator for comparing the third, fourth and sixth signal to a ramp signal, wherein the comparator forms a seventh signal; and control circuitry for controlling the switching of the switch in response to the seventh signal.

8. The apparatus according to claim 7, wherein the first signal is representative of an average voltage over a time period of several cycles of the switch control signal.

9. The apparatus according to claim 7, wherein the first offset voltage level is representative of a voltage formed across the reactive element under steady-state load conditions.

10. The method according to claim 7, wherein said seventh signal is set to a minimum duty cycle whenever the said third or the said fourth signal exceeds a set value.

11. An apparatus for limiting current through a reactive element in a voltage converter, comprising:

a switch coupled to a first terminal of a reactive element for switching current from a supply through the reactive element in accordance with a switch control signal for forming a regulated output voltage in a feedback loop;

a first amplifier having a first input terminal coupled to receive a first signal from a first terminal of the reactive element and a second input terminal coupled to receive a second signal that is representative of a voltage at a second terminal of the reactive element wherein the second signal is offset from the voltage at the second terminal of the reactive element by a first offset voltage level and wherein the first amplifier functions as a low pass filter with respect to the first signal and forms a third signal at its output that is representative of a level of current flowing through the reactive element in a first direction;

a second amplifier having a first input terminal coupled to receive a fourth signal from a first terminal of the reactive element and a second input terminal coupled to receive a fifth signal that is representative of a voltage at a second terminal of the reactive element wherein the fifth signal is offset from the voltage at the second terminal of the reactive element by a second offset voltage level and wherein the second amplifier functions as a low pass filter with respect to the fourth signal and forms a sixth signal at its output that is representative of a level of current flowing through the reactive element in a second direction opposite the first direction;

sensing a voltage that is representative of the output voltage of the voltage converter;

forming a seventh signal that is representative of a difference between the output voltage and the desired voltage;

a comparator for comparing the third, sixth and seventh signals to a ramp signal, wherein the comparator forms a eighth signal; and control circuitry for changing switching of the switch in response to the eighth signals.

12. The apparatus according to claim 11, wherein the third signal is representative of an average voltage over a time period of several cycles of the switch control signal.

13. The method according to claim 11, wherein said eighth signal is set to a minimum duty cycle whenever the said sixth and said third signal exceeds a set value.

14. The apparatus according to claim 11, wherein the first offset voltage level is representative of a voltage formed across the reactive element under steady-state load conditions.

15. A method of limiting a current through a reactive element in a voltage converter, comprising:

switching current from a supply through a reactive element in accordance with a switch control signal for forming a regulated output voltage in a feedback loop;

sensing a first signal that is representative of a level of current passing through the reactive element in a first direction;

sensing a voltage that is representative of the output voltage of the voltage converter;

forming a second signal that is representative of a difference between the output voltage and a desired voltage;

forming a third signal that is representative of a level of current passing through the reactive element in a second direction opposite the first direction;

comparing a selected one of the first, second and third signals to a ramp signal for forming the switch control signal wherein the selected one is selected according to the relative magnitudes of the first, second and third signals; and when the first signal exceeds the maximum current limit setting the switch control signal to a minimum duty cycle.

* * * * *